July 1, 1947.  H. C. ROTERS  2,423,345
ALTERNATING CURRENT DYNAMOELECTRIC MACHINE
Filed Feb. 9, 1944
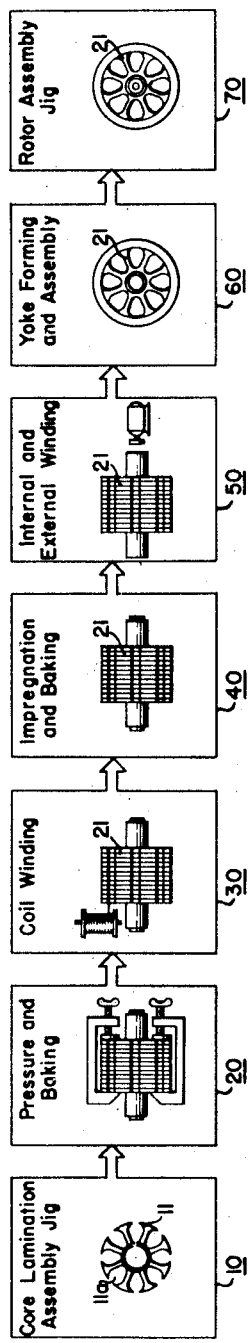
FIG.1
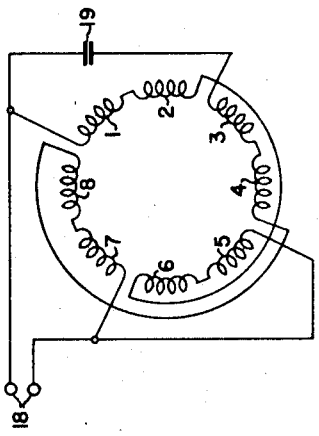
FIG.3
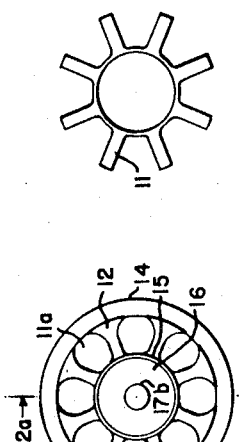
FIG. 2c
FIG.2b
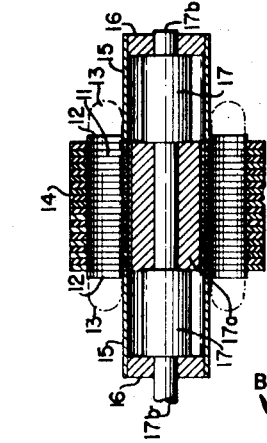
FIG.2a
INVENTOR
HERBERT C. ROTERS
BY Lawrence B. Dodds
ATTORNEY Patented July 1, 1947

2,423,345

UNITED STATES PATENT OFFICE 2,423,345

ALTERNATING-CURRENT DYNAMO-ELECTRIC MACHINE

Herbert C. Roters, Roslyn, N. Y., assignor to Casner Patents, Inc., a corporation of Delaware Application February 9, 1944, Serial No. 521,650

5 Claims. (Cl. 172—278)

This invention relates generally to alternating-current dynamoelectric machines and more particularly to such machines without a commutated armature. While the invention is of general application, it is especially adapted to fractional horsepower motors and generators having power outputs in the range up to one-half horsepower. It is particularly advantageous for embodiment in a self-starting hysteresis synchronous motor.

Fractional horsepower motors have a wide range of application in industrial and domestic appliances. In the past these have generally been of the direct-current or universal commutated armature type or of the induction or synchronous types with distributed polyphase armature windings. The former type has the disadvantages of all commutator machines, namely, they are subject to wear and misadjustment of the commutator brushes, sparking at the commutator with the resultant wear and possible short circuit of the commutator. In addition, they create troublesome high-frequency interference which is disturbing to radios and other domestic appliances. The latter type has the disadvantage that, for a given power output, they are of relatively large volume and weight and are subject to high cost of manufacture in forming and placing the polyphase distributed winding. For example, in these small motors of the alternating-current type with internal slots, it is customary to wind the coil in the open slot of the stator one turn at a time by threading the wire through the stator tunnel with a winding gun or by preforming the coil outside of the machine and inserting it in the slot one conductor at a time.

In Patent No. 2,328,743, granted September 7, 1943, on my application, and entitled "Self-starting hysteresis motor," there is disclosed and claimed a self-starting hysteresis synchronous motor adapted for construction in fractional horsepower sizes by which the volume and weight of the motor for a given horsepower output may be substantially reduced. The present invention when applied to a motor of the type disclosed in the aforesaid patent provides an improved motor of such type which avoids both the use of a commutated armature and the forming and placing of the motor winding in a small armature tunnel with the attendant disadvantages noted above.

It is an object of the present invention, therefore, to provide a new and improved alternating-current dynamoelectric machine which is small, compact, inexpensive, and which avoids one or more of the above-mentioned disadvantages of the arrangements of the prior art.

It is another object of the invention to provide an improved alternating-current dynamoelectric machine without a commutated armature in which the armature may nevertheless be wound in a conventional armature winding machine.

In accordance with the invention, an alternating-current dynamoelectric machine comprises a stack of electrically insulated annular core laminations and one or more supporting bearing plates with external radial winding slots, and a layer of thermoplastic adhesive material interposed between adjacent laminations and between the laminations and the bearing plate or plates and constituting the sole means for securing the laminations and plates together without substantially impairing their insulation to form a unitary core structure. The machine further includes an energizing winding disposed in the external slots, a magnetic yoke disposed about the core structure and the winding, a supporting bearing mounted from and supported solely by each plate, and a co-operating rotor disposed within the annular core structure and supported in the bearing or bearings.

Further in accordance with the invention, there is provided an alternating-current dynamoelectric machine comprising a magnetic core including a stack of electrically insulated core laminations and one or more supporting bearing sleeve plates having unitary extending bearing sleeves forming with such core a unitary structure, such structure having a smooth continuous cylindrical bore through the core and sleeves. The core structure also has a plurality of external radial winding slots in which is disposed a polyphase distributed energized winding, and a magnetic yoke is disposed about the core structure and the winding. The machine further includes a supporting bearing mounted directly from each bearing sleeve plate and a co-operating smooth cylindrical rotor disposed within the bore of the core structure and supported in such bearings.

In a preferred form of the invention as applied to a self-starting hysteresis synchronous motor, the energizing winding is a polyphase distributed winding and the rotor includes a soft steel central portion and a surrounding annular shell of a material having a high hysteretic constant, such as an aluminum-nickel-cobalt alloy.

By the term "external slots" as used herein and in the appended claims is meant a slot which is open at the outer periphery of the armature core structure and closed at the inner periphery thereof.

For a better understanding of the invention, together with other and further objects thereof, reference is had to the following description taken in connection with the accompanying drawing and its scope will be pointed out in the appended claims.

Referring now to the drawing, Fig. 1 is a schematic lay-out of an apparatus for manufacturing the alternating-current motor embodying the invention; Fig. 2a is a longitudinal across section and Fig. 2b is an end view of an improved motor structure constructed in accordance with the method of Fig. 1 with the winding omitted from Fig. 2b for the sake of clarity; Fig. 2c is a view of a modified form of core lamination; while Fig. 3 is a schematic circuit diagram illustrating a method of connection of the windings of the motor of Figs. 2a and 2b.

Referring now to Fig. 1 of the drawing, there is represented schematically a lay-out of an apparatus for constructing an alternating-current dynamoelectric machine in accordance with the invention. The process is initiated in unit 10 in which a stack of electrically insulated annular core laminations 11 and supporting end plates are assembled, preferably by a jig having a central rod which is inserted in the central bore of the laminations to hold the parts in close axial alignment. This central rod should be wrapped in thin paper or covered with a stripping compound to prevent bonding of the rod to the core laminations and the end plates during the assembling process to be described. The laminations and end plates are formed with external radial winding slots 11a, 11a, the laminations 11 being formed of conventional high permeability magnetic material, while the end plates are preferably of non-magnetic material having high resistivity, such as stainless steel. During the assembling process a layer of adhesive or bonding material, such as a thermo-setting cement or varnish, is applied between successive laminations and between the terminal laminations and the end plates to form an assembly. This assembly is then clamped together under high pressure and subjected to baking in unit 20 while in such clamps. The adhesive material used for this purpose may be a polyvinyl-butyral resin or phenolic modification thereof or a copolymer of vinyl acetate and vinyl chloride and commercially available as "Du Pont 4624," "Du Pont 4631," "Cordo Adhesive" and "Bostik"; or it may be furfural resin commercially available as "Cycleweld cement." This method is effective to secure the laminations together without substantially impairing their insulation, the adhesive material under heat and pressure uniting the laminations to form a unitary core structure 21.

Following the assembly process described above, the unitary core structure 21 is similar to that of the armature of a conventional direct-current motor. This core structure is then wound in a conventional coil winding unit 30 in a well-known manner and in any of a number of conventional winding patterns. The core structure 21 is then transferred to the unit 40 wherein the winding is impregnated with an electrical varnish and is baked. During this process care should be taken to close the ends of the stator tunnel to prevent the insulating varnish from running in. The winding of the core structure 21 together with the subsequent impregnation with insulating varnish and baking serves further to unite it into a single rigid unit.

The unitary core structure 21 is then transferred to the unit 50 in which the outer periphery is finished to a cylindrical surface and the inner bore of the structure is also finished to a smooth continuous cylindrical surface, either by turning or grinding. The finished core structure 21 is then transferred to the unit 60 in which a magnetic yoke is formed about the core structure. For example, a stack of annular laminated members are placed about the core structure to form a yoke, or a plurality of turns of magnetically insulated strip material are wound about the core structure to form a yoke. The motor structure is then transferred to the unit 70 in which bearings are mounted from the rotor structure and a co-operating rotor is mounted within the annular core structure to complete the construction of the motor.

One type of motor structure resulting from the method of manufacture described above is illustrated in Figs. 2a and 2b, namely, a self-starting hysteresis synchronous motor. This motor comprises a stack of electrically insulated annular core laminations 11 and supporting end plates 12, 12 having a cylindrical bore and a plurality of external radial winding slots 11a, 11a. The layer of thermo-setting adhesive material, such as the cement or varnish, interposed between the adjacent laminations and end plates constitutes the sole means for securing the laminations and the end plates together to form a unitary magnetic core structure without substantially impairing their insulation. A conventional polyphase distributed energizing winding is disposed in the external winding slots 11a (omitted in Fig. 2b for the sake of clarity) and may comprise any desired winding pattern. The motor also comprises an annular magnetic yoke 14 disposed about the central core structure, for example, it may comprise a series of annular laminations surrounding the core structure and the winding. Supported from the end plates 12, 12 are a pair of unitary hubs or bearing sleeves 15, 15 which can be attached to the end plates by welding, brazing, or like process. Within the ends of the sleeves 15 are directly mounted the bearings 16, 16 from which are supported a co-operating rotor 17 which is disposed within the bore of the annular core structure as indicated. With this construction, each of the bearings 16 is supported solely by its respective unitary plate 12 and bearing sleeve 15. In the case of a hysteresis motor, such as that shown in Figs. 2a, 2b, the rotor comprises a smooth cylinder or annular shell 17a of a material having a high hysteretic constant, such as an aluminum-nickel-cobalt alloy disposed on a central portion 17b of non-magnetic material, such as stainless steel, which also serves as the motor shaft. The rotor including the portion 17b may be milled from a single rod, the portion 17a being cast in the annular recess, or the portion 17a and the end hubs of the rotor 17 may be formed separately and assembled in any suitable fashion on a continuous shaft of the size of the portion 17b. Alternatively the rotor may be constructed in any conventional hysteresis motor form, such as any of those illustrated and described in aforesaid Patent No. 2,328,743. The motor structure as thus constructed may be inserted in any suitable protective housing, not shown, which may serve also to carry the winding terminals.

The operation of the motor of Figs. 2a, 2b is substantially as described in aforesaid Patent No. 2,328,743.

The armature teeth separating the radial external slots 11a are shown flared at the outer radius in order to provide a path of greater permeance for the flux between the core teeth and the yoke. However, if the fit between these parts is sufficiently close, this flare may be eliminated by constructing the teeth as straight radial spokes, thereby providing a greater winding space, as illustrated in Fig. 2c. In the case of hysteresis motors as described, the closed inner ends of the winding slots greatly reduce the parasitic hysteresis losses in the rotor otherwise occasioned by the pulsation in the flux produced by the open slots between the rotor teeth. With this construction the smooth cylindrical surface of the rotor co-operates with the smooth cylindrical bore of the core structure and supporting bearing sleeves to provide a minimum air gap which it is preferable to reduce to the minimum value allowed by mechanical considerations. The radial thickness of the magnetic bridge at the inner ends of the winding slots is preferably made as small as consistent with structural rigidity particularly when embodied in an induction type of motor.

The alternating-current dynamoelectric machine of the type described above has a number of advantages. It permits the armature of a small non-commutated alternating-current machine to be wound in a conventional armature winding machine, thus avoiding the difficult hand winding in a small tunnel of an armature with internal winding slots. In addition, the bearings are supported directly from the core structure whereby it constitutes a self-contained dynamoelectric machine. Also, with this structure there are no limitations as to the number of winding slots that can be provided, as there is no mechanical interference between the several motor windings. In the construction of Figs. 2a and 2b there is an added advantage that the armature tunnel and the bearing sleeves 15, 15 may be bored to the same diameter in one operation, ensuring a high degree of concentricity between the armature and rotor without expensive machining operations, permitting the use of the minimum air gap and ensuring maximum magnetic efficiency.

With the dynamoelectric machine construction of the invention, it is possible to provide a multiple slot winding with each winding spanning several teeth. For example, in Fig. 3 there is represented schematically a circuit diagram of a two-phase motor constructed as described above having eight winding slots and eight windings 1–8, inclusive. As indicated, windings 1, 2, 6, and 5, respectively, are connected across the supply terminals 18, while the windings 3, 4, 8, and 7, respectively, are connected across the supply terminals 18 through a phase-shifting condenser 19 to provide a uniform rotating magnetic field. The several windings are disposed in the slots indicated in the following table:

| Winding | Slots |
| --- | --- |
| 1 | 1 and 4 |
| 2 | 2 and 5 |
| 3 | 3 and 6 |
| 4 | 4 and 7 |
| 5 | 5 and 8 |
| 6 | 6 and 1 |
| 7 | 7 and 2 |
| 8 | 8 and 3 |

Certain modifications of the method and structure described above may be made while still realizing substantially the advantages enumerated above. For example, the stack of laminations 11 and end plates 12 may be held together by rivets, provided that they and the end plates are formed of high resistivity material to minimize eddy currents, or provided that the rivets are insulated from the end plates. Also, while the stator laminations are shown as having eight winding slots and the motor wound as a two-phase eight-winding motor, it will be apparent that the number of winding slots may be any number appropriate to the type of winding and the number of poles and phases required.

The invention has been specifically illustrated and described as embodied in a self-starting hysteresis motor; however, it will be apparent to those skilled in the art that it is applicable to alternating-current dynamoelectric machines generally, specifically including induction motors and synchronous generators.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An alternating-current dynamoelectric machine comprising a stack of electrically insulated annular core laminations and one or more supporting bearing plates with external radial winding slots, a layer of thermoplastic adhesive material interposed between adjacent laminations and between said laminations and said plate and constituting the sole means for securing said laminations and plates together without substantially impairing their insulation to form a unitary core structure, an energizing winding disposed in said external slots, a magnetic yoke disposed about said core structure and said winding, a supporting bearing mounted from and supported solely by each plate, and a cooperating rotor disposed within the annular core structure and supported in said bearing or bearings.

2. An alternating-current dynamo-electric machine comprising, a stack of electrically insulated annular core laminations and a pair of supporting bearing plates with external radial winding slots, a layer of thermoplastic adhesive material interposed between adjacent laminations and between said laminations and said plates constituting the sole means for securing said laminations and plates together without substantially impairing their insulation to form a unitary core structure, a polyphase distributed energizing winding disposed in said external slots, a magnetic yoke disposed about said core structure and said winding, a supporting bearing mounted from and supported solely by each plate, and a cooperating rotor disposed within the bore of said core structure and supported in said bearings.

3. An alternating-current dynamoelectric machine comprising, a magnetic core comprising a stack of electrically insulated annular core laminations, one or more supporting bearing-sleeve plates having unitary extending bearing sleeves forming with said core a unitary structure, said structure having a smooth continuous cylindrical bore through said core and said sleeves and a plurality of external radial winding slots, a polyphase distributed energizing winding disposed in said external slots, a magnetic yoke disposed about said core structure and said winding, a supporting bearing mounted directly from each bearing sleeve, and a cooperating smooth cylindrical rotor disposed within the bore of said core structure and supported in said bearings.

4. An alternating-current dynamoelectric machine comprising a stack of electrically insulated annular core laminations and a pair of supporting bearing-sleeve plates having unitary extending bearing sleeves, said stack being formed with external radial winding slots and said stack and sleeves being formed with a continuous finished cylindrical bore therethrough, means for securing said laminations and plates together without substantially impairing their insulation to form a unitary core structure, an energizing winding disposed in said external slots, a magnetic yoke disposed about said core structure and said winding, a supporting bearing mounted directly from each bearing sleeve, and a cooperating rotor disposed within the annular core structure and supported in said bearings.

5. An alternating-current dynamoelectric machine comprising a stack of electrically insulated annular core laminations having external radial winding slots, one or more supporting bearing sleeve plates each having a unitary extending bearing sleeve, means for securing said laminations and said bearing sleeve plates together without substantially impairing their insulation to form a unitary core structure with a smooth continuous cylindrical bore through said core and said sleeves, an energizing winding disposed in said external slots, a magnetic yoke disposed about said core structure and said winding, a supporting bearing mounted directly in each supporting sleeve, and a cooperating rotor disposed within said annular core structure and supported in said bearings, said rotor having a smooth cylindrical surface cooperating with the bore of said core structure and supporting sleeves to provide a uniform air gap of minimum value.

HERBERT C. ROTERS.

REFERENCES CITED

The following references are of record in the file of this patent:

UNITED STATES PATENTS

| Number | Name | Date |
|---|---|---|
| 755,819 | Watmough, Jr. | Mar. 29, 1904 |
| 1,440,952 | Apple | Jan. 2, 1923 |
| 1,957,380 | Barlow | May 1, 1934 |
| 1,978,100 | Buerke | Oct. 23, 1934 |
| 2,057,503 | Sawyer | Oct. 13, 1936 |
| 2,183,404 | Morrill | Dec. 12, 1939 |
| 2,187,033 | Hubacker | Jan. 16, 1904 |
| 2,322,924 | Daiger | June 29, 1943 |
| 2,303,291 | Moss | Nov. 24, 1942 |
| 2,025,817 | Lanz | Dec. 31, 1935 |
| 2,039,456 | Sammarone | May 5, 1937 |
| 2,328,743 | Roters | Sept. 7, 1943 |